United States Patent

Kramer

[11] 3,723,558
[45] Mar. 27, 1973

[54] PRODUCTION OF PURE P-XYLENE
[75] Inventor: Friedrich Kramer, Gelsenkirchen, Germany
[73] Assignee: Fried Krupp Gesellschaft Mit Beschrankter Haftung, Essen, Germany
[22] Filed: Sept. 30, 1970
[21] Appl. No.: 76,711

[30] Foreign Application Priority Data

Oct. 1, 1969 Germany............. P 19 49 446.3

[52] U.S. Cl. ............................................260/674 A
[51] Int. Cl. ...............................................C07c 7/14
[58] Field of Search.................................260/674 A

[56] References Cited

UNITED STATES PATENTS

| 2,985,694 | 5/1961 | Talbot | 260/674 |
| 2,820,070 | 1/1958 | Bennett et al. | 260/674 |
| 3,177,265 | 4/1965 | Lammers | 260/674 |
| 2,931,841 | 4/1960 | Vault | 260/674 |

Primary Examiner—Delbert E. Gantz
Assistant Examiner—C. E. Spresser
Attorney—Spencer & Kaye

[57] ABSTRACT

P-xylene is separated from a liquid hydrocarbon mixture of p-xylene and at least one other isomeric xylene by crystallizing p-xylene from the mixture and subsequently separating p-xylene crystals in a first and in a subsequent second separator which furnishes a p-xylene end product having a purity of more than 98 percent by weight and from which the liquid effluent containing p-xylene is partially recirculated into the feed stream of the second separator and is partially recirculated through an additional crystallizer and separator so that the resulting crystals are admixed with feed for the second separator and the liquid effluent is admixed with the feed for the first crystallizer.

11 Claims, 1 Drawing Figure

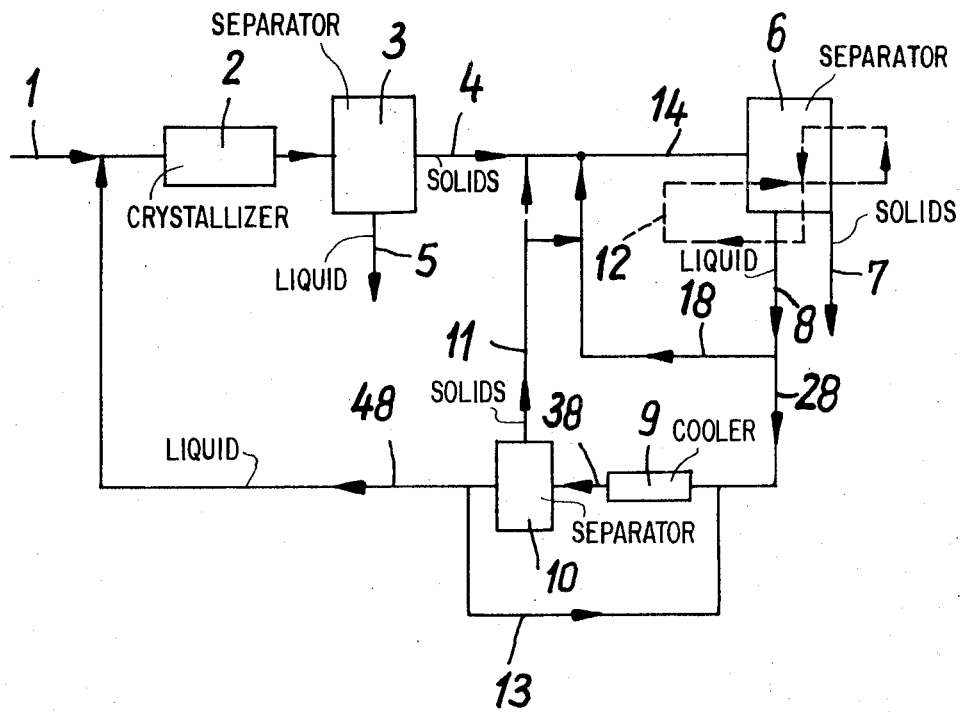

PRODUCTION OF PURE P-XYLENE

BACKGROUND OF THE INVENTION p-Xylene is separated by plural crystallizations from a mixture of hydrocarbons. When several crystallizations are effected in series, with separation of produced crystals following each crystallization, products having a purity as high as 98 percent by weight of p-xylene can be obtained from the separation following the second crystallization. However, even when liquid effluent from the final separation is recirculated and mixed with solids from the first separation and/or feed, an unnecessarily high power requirement is realized and the final p-xylene purity still leaves something to be desired.

SUMMARY OF THE INVENTION

The present invention relates to a method for producing pure p-xylene from a liquid hydrocarbon mixture of p-xylene and at least one further isomeric xylene by crystallizing the p-xylene from the mixture in a crystallizer and subsequently separating p-xylene crystals in a first and in a subsequent second separator which furnishes a p-xylene end product having a purity of more than 98 percent, preferably 99.8 percent, by weight, and from which a partial stream of the separated p-xylene-containing solution mixture is recirculated into the feed stream of the second separator.

By recirculating part of the liquid effluent from the second separator through an additional crystallizer and separator so that resulting solids are admixed with the feed for the second separator and the liquid effluent is admixed with the feed for the first crystallizer, the economy, operational dependability of the process and purity of the final p-xylene are improved.

BRIEF DESCRIPTION OF THE DRAWING

The sole FIGURE is a flow diagram of the subject process.

DETAILS

With reference to the drawing, a hydrocarbon feed mixture 1, containing, e.g., from 16 to 25 percent by weight of p-xylene and at least 70 percent by weight of one or more isomers of p-xylene, is crystallized at a temperature of from about −60° to about −70°C in crystallizer 2. A first separator 3, e.g. a filter, separates liquid effluent, e.g. filtrate, 5 from a suspension 4 having a p-xylene purity of approximately 80 to 95 percent by weight. The liquid effluent represents from about 80 to 90 percent by weight of the feed 1 and has a p-xylene content of from about 7.5 to 15 percent by weight.

Crystalline p-xylene, which accounts for approximately 75 to 90 percent by weight of suspension 4, is further separated from its associated liquid in a second separator, e.g. a centrifuge, 6. Solids 7, taken from the second separator as a finished product, have a p-xylene purity of from 98 to 99.8 percent by weight and represent from about 60 to 70 percent by weight of the p-xylene in feed 1.

Separator 3 may consist of a rotary vacuum filter, which is divided into more than 40 cells. While rotating specific sectors of the filter "liquid zone" and "dry zone" are exposed to an air stream, which is passed through the filter cake.

During separation in separator 3, the material being treated is maintained at a temperature of from about −50° to about −70°C, whereas the temperature maintained in separator 6 is generally from about +1° to about −16°C.

A centrifuge as a combination of the conical solid bowl type machine with the screening centrifuge is suitable for use as separator 6.

First the slurry is pre-thickened in the conical solid bowl. Then the slurry is carried over the cylindrical screen sections where it is washed and dewatered before discharging into the solids melter.

Separator 10 is constructed like separator 6 but without a washing section.

The liquid effluent 8 from separator 6 has a p-xylene content of from about 60 to about 80, preferably approximately 75 percent by weight. This effluent, which represents from about 30 to 45 percent by weight of feed 1, is divided into two streams, of which stream 18 is recirculated to the feed 14 of separator 6 and stream 28 is subjected to a further crystallization in cooler 9, which serves as an additional crystallizer. The proportion of effluent 8 which is recirculated may vary from about 65 to about 80 percent by weight thereof.

The cooler is a double pipe heat exchanger with scraped surfaces. The scraper assembly is driven through a gear reducer with different speeds. The construction is similar to that of crystallizer 2.

The temperature maintained in cooler 9 is generally from about −60° to about −20°C.

Effluent 38 from cooler 9 is separated in a third separator 10, which may be either a filter, such as that described for separator 3, or a centrifuge, such as that described for separator 6. During separation of liquid effluent 48 from solids 11, separator 10 is maintained at a temperature of from about −60° to about −20°C.

Concentrate 11 from separator 10 has a p-xylene content of from about 70 to about 95 percent by weight and represents from about 20 to about 35 percent by weight of the p-xylene in feed 1. Although there is some dependency on the purity required for the finished p-xylene product 7, crystalline p-xylene in concentrate 11 corresponds to approximately 30 percent by weight of the p-xylene in suspension 4 leaving separator 3. It is recirculated either directly to feed 4 of separator 6 or indirectly thereto through stream 18.

Liquid effluent 48, which represents from about 2 to about 5 percent by weight of inlet feed 1, is recirculated to feed 1. This liquid effluent has a p-xylene content of from about 10 to about 38 percent by weight, which is from about 3 to about 7 percent by weight of the p-xylene in feed 1.

From about 100 to about 160 percent by weight of liquid effluent 48 may, as an alternative, be recirculated to stream 28 and thus to cooler 9. When such recirculation is employed, the charge to cooler 9 contains from about 25 to about 40 percent by weight of p-xylene.

Recirculation of liquid effluent 48 by stream 13 reduces the p-xylene concentration in the charge of cooler 9 so that the concentration of crystallized p-xylene in the effluent 38 does not exceed 40 percent by weight even when the temperature in cooler 9 is maintained at a temperature of from −60° to −20°C.

In the second separator 6, the crystalline p-xylene is almost completely separated from the intake stream 14. The crystals are substantially free from any adhering liquid. If required, they are subsequently washed with a solution 12 having a p-xylene content of from 98 to 99.8 percent by weight. The resulting washing filtrate is then recirculated to intake stream 14 ahead of the second separator 6. Effluent 48, which is low in p-xylene and which leaves the additional separator 10 at a temperature of $-60°$ to $-20°C$, has a p-xylene content of approximately 10 to 30 percent by weight.

Solution 12 is obtained from the p-xylene product melter Its p-xylene content is preferably at least 98 percent by weight. During washing, its temperature is maintained at from about $+20°$ to about $+60°$ C. The amount of solution 12 employed is preferably from 0.1 to 0.35 kilograms per kilogram of p-xylene crystal stream 7.

According to the present invention, partial stream 18, which is branched off from stream 8, can also be eliminated. In such case the entire solution mixture 8 coming from the second separator 6 passes through the additional crystallizer 9 and the subsequently connected additional separator 10.

The p-xylene concentration of intake stream 14 of the second separator 6 is raised or lowered by increasing or decreasing the quantity of effluent 48 which is recirculated or, with a constant quantity of effluent 48, by reducing or increasing the temperature of cooler 9, respectively.

An advantage of this process is that the p-xylene content of the solution mixture, which is returned to the intake hydrocarbon mixture of the crystallizer ahead of the first separator device, can be substantially lower than in known processes. The cooling power required for the entire separation process is as much as 25 percent lower than in prior processes since crystallization of the p-xylene from the solution mixture (which is still relatively highly concentrated) in the third separator 10 can occur at a higher temperature, e.g. $-30°$ to $-40°$ C, than in the first separator 3 after mixing with the intake hydrocarbon mixture. The low p-xylene concentration level in the crystallizer 2 ahead of the first separator stage requires temperatures between $-60°$ and $-70°C$.

For any total fixed quantity of p-xylene crystals of a given purity, the work required for separation is reduced because the maximum rate of separation is reduced. The present process has sufficient controls to assure uniformity in the rate and purity of p-xylene crystals obtained from separator 6. Separating p-xylene from the solution mixture 8 leaving the second separator and returning a concentrate 11, which has been enriched with p-xylene in an additional separator device 10, into the intake stream of the second separator permits controlled compensation for operating fluctuations in a simple manner so that the p-xylene content of the concentrate which is returned into the second separator device and which is enriched with p-xylene is readily regulated.

Thus previously required provisions for excess capacity to absorb fluctuations during operation (with due consideration for separation processes which could not be accurately predetermined) are no longer necessary. The entire process is substantially improved with respect to economy of operation.

EXAMPLE

A p-xylene-containing liquid hydrocarbon 1 having the following chemical analysis:
Ethyl-Benzene 27.60 %
para-xylene 21.20 %
meta-xylene 47.60 %
ortho-xylene 3.60 %
and a temperature of 30 °C is fed at the rate of 7,165 kilograms per hour into crystallizer 2. The feed 1 represents 1,519 kilograms per hour of p-xylene. (All further quantity figures are based on this hourly rate and represent the amounts obtained per hour.)

Crystallizer 2 is maintained at a temperature of $-65$ °C. The feed is subjected to this temperature in the crystallizer for 3 minutes before removing same to separator 3, which is maintained at a temperature of $-65$ °C. The separator 3 is a filter from which 6,165 kilograms of filtrate 5 containing 524 kilograms of p-xylene are removed. The concentrate 4 from the separator weighs 1,209 kilograms, of which 1,064 kilograms is pure p-xylene.

Concentrate 4 is subjected to a further separation in separator 6, which is a centrifuge maintained at a temperature of $-4$ °C. Liquid effluent from the centrifuge consists of 2,703 kiloliters, of which 1,783 kilograms is p-xylene.

Solids obtained from the centrifuge are washed twice with a total of 205 kilograms of a liquid solution 12 having a temperature of 50 °C and a chemical analysis:
Ethyl-Benzene 0.18 %
para-xylene 99.50 %
meta-xylene 0.30 %
ortho-xylene 0.02 %
The thus washed solids consist of 1,200 kilograms of 99 percent (by weight) pure p-xylene crystals.

The used wash solution 12, having a p-xylene content of 204 kilograms, is admixed with the liquid effluent from the centrifuge. The combined liquids 8 comprise 2,703 kilograms, of which 1,783 kilograms are P-xylene.

A major proportion of the combined liquids, namely: 73 percent by weight, is recirculated via stream 18 and admixed with concentrate 4, whereas the remainder thereof is passed into cooler 9, which is maintained at a temperature of $-25$ °C, and kept therein for a period of 3.5 minutes. The effluent from cooler 9 is subjected to separation in separator 10, from which the p-xylene concentrate 11 comprises 514 kilograms, of which 394 kilograms are p-xylene. The liquid effluent 48 comprises 209 kilograms of which 69 kilograms are p-xylene.

Concentrate 11 is admixed with concentrate 4, and liquid effluent 48 is partly recirculated and partly admixed with the feed 1. Prior to admixture with feed 1, however, a major proportion, namely: 52.5 percent by volume, of the liquid effluent 48 is recirculated and admixed with the feed 28 to cooler 9.

According to an alternative embodiment concentrate 11 is combined with stream 18, and the resultant is admixed with concentrate 4.

In a further embodiment none of the combined liquids 8 are recirculated via stream 18, and the total combined liquids are passed through cooler 9.

In another embodiment the process is effected without using any wash solution 12.

In an additional embodiment the entire liquid effluent 48 is admixed with feed 1.

The following equipment was used:

| | |
|---|---|
| Cooler 2: | Scraped-surface exchanger |
| Separator 3: | Rotary vacuum filter |
| Separator 6: | Screen bowl centrifuge |
| Cooler 9: | Scraped-surface exchanger |
| Separator 10: | Screen bowl centrifuge |

A material balance for the example is presented diagramatically as follows:

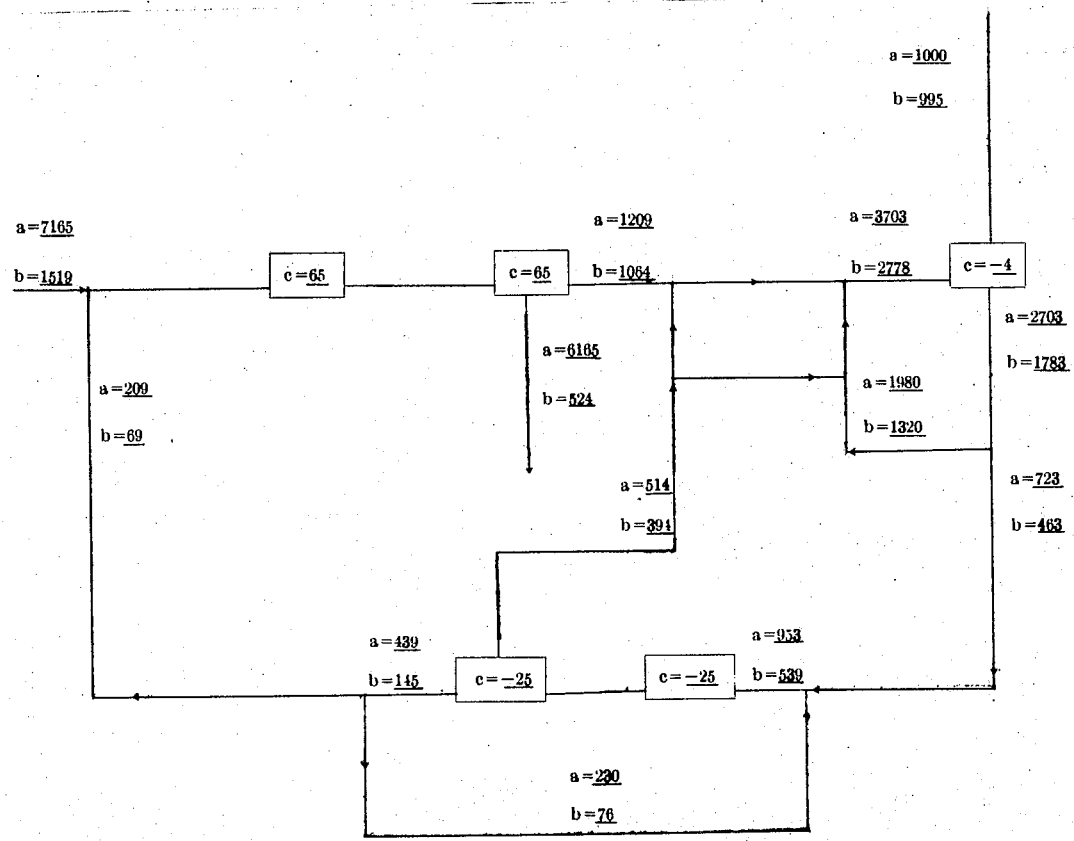

$a$ = mass flow hydrocarbon mixture kg/h
$b$ = mass flow p-xylene in hydrocarbon mixture kg/h
$c$ = temperature ° C
Wash Solution in stream 8 204.8 kg/h The preceding description of the present invention is suceptible to various modifications, changes and adaptations, and the same are intended to be comprehended within the meaning and range of equivalents of the appended claims.

I claim:

1. A method of separating p-xylene from a hydrocarbon mixture thereof containing at least one other isomeric xylene which comprises crystallizing p-xylene in the mixture, separating a first p-xylene-poor liquid from the resultant to yield a first p-xylene concentrate, separating essentially pure p-xylene crystals from liquid in the concentrate, crystallizing additional p-xylene in the liquid separated from the concentrate, separating a second distinct p-xylene-poor liquid and a second distinct p-xylene concentrate from the resultant, admixing the second p-xylene-poor liquid with the hydrocarbon mixture and admixing the second p-xylene concentrate with the first p-xylene concentrate.

2. A method according to claim 1 wherein the essentially pure p-xylene crystals have a purity in excess of 98 percent by weight.

3. A method according to claim 2 wherein the essentially pure p-xylene crystals have a purity of at least 99.8 percent by weight.

4. A method according to claim 1 which comprises admixing a minor proportion of the liquid separated from the essentially pure p-xylene crystals with the first p-xylene concentrate.

5. A method according to claim 1 which comprises washing the essentially pure p-xylene crystals with a solution having a high p-xylene concentration and admixing the resulting washing solution with the liquid separated from the essentially pure p-xylene crystals.

6. A method according to claim 1 which comprises admixing a minor proportion of the liquid separated from the essentially pure p-xylene crystals with the second p-xylene concentrate before admixing the latter with the first p-xylene concentrate.

7. A method according to claim 1 which comprises admixing a minor proportion of the second p-xylene-poor liquid with liquid separated from the essentially pure p-xylene crystals.

8. A process for controlling the uniform rate of production and purity of p-xylene obtained by a method of claim 1 which comprises varying the temperature employed for crystallizing p-xylene in the liquid separated from the essentially pure p-xylene crystals.

9. A process for controlling the uniform rate of production and purity of p-xylene obtained by a method of claim 1 which comprises varying the amount of the second p-xylene-poor liquid which is admixed with the hydrocarbon mixture.

10. A process according to claim 9 which comprises varying an amount of the second p-xylene-poor liquid which is admixed with liquid separated from the essentially pure p-xylene crystals.

11. A process for controlling the uniform rate of production and purity of p-xylene obtained by a method of claim 4 which comprises varying the proportion of the liquid separated from the essentially pure p-xylene crystals which is admixed with the first p-xylene concentrate.

* * * * *